United States Patent
Bai et al.

(10) Patent No.: US 11,723,011 B2
(45) Date of Patent: Aug. 8, 2023

(54) GAP TIME CONFIGURATION AFTER BEAM SWITCH

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 17/224,963

(22) Filed: Apr. 7, 2021

(65) Prior Publication Data

US 2022/0330219 A1    Oct. 13, 2022

(51) Int. Cl.
*H04W 24/10* (2009.01)
*H04W 72/044* (2023.01)

(52) U.S. Cl.
CPC ......... *H04W 72/046* (2013.01); *H04W 24/10* (2013.01)

(58) Field of Classification Search
CPC .......................... H04W 72/046; H04W 24/10
See application file for complete search history.

(56) References Cited

U.S. PATENT DOCUMENTS

2019/0349915 A1* 11/2019 Ahn ..................... H04W 72/046
2022/0173786 A1*  6/2022 Cui ......................... H04L 5/001

FOREIGN PATENT DOCUMENTS

WO      2021050060 A1    3/2021

OTHER PUBLICATIONS

International Search Report and Written Opinion—PCT/US2022/071587—ISA/EPO—dated Jul. 13, 2022.

* cited by examiner

*Primary Examiner* — Chuong A Ngo
(74) *Attorney, Agent, or Firm* — Patterson + Sheridan, LLP

(57) ABSTRACT

Certain aspects of the present disclosure provide techniques for beam switching gaps. An example method by a user equipment (UE) generally includes receiving signaling, from a network entity, indicating a beam switch from a first beam to a second beam, performing the beam switch from the first beam to the second beam, identifying a gap time after the beam switch when one or more conditions are met, and communicating with the network entity, after the gap time, using the second beam.

28 Claims, 10 Drawing Sheets

300

| SCS (kHz) | CP length (μs) | Symbol duration (μs) |
|---|---|---|
| 15 | 4.69 | 66.67 |
| 30 | 2.345 | 33.335 |
| 60 | 1.725 | 16.668 |
| 120 | 0.5625 | 8.3338 |
| 240 | 0.29313 | 4.1669 |
| 480 | 0.14656 | 2.0834 |
| 960 | 0.07328 | 1.0417 |
| 1920 | 0.03664 | 0.5209 |
| 3840 | 0.01832 | 0.2604 |

FIG. 3

GAP TIME CONFIGURATION AFTER BEAM SWITCH

BACKGROUND

Field of the Disclosure

Aspects of the present disclosure relate to wireless communications, and more particularly, to techniques for beam switching.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include a beam switching gap that can be dynamically configured/indicated and that can be at least one symbol in length, for example, to accommodate high frequency ranges and/or larger subcarrier spacing (SCS).

One innovative aspect of the subject matter described in this disclosure can be implemented in a method for wireless communications by a user equipment (UE). The method generally includes receiving signaling, from a network entity, indicating a beam switch from a first beam to a second beam, performing the beam switch from the first beam to the second beam, identifying a gap time after the beam switch when one or more conditions are met, and communicating with the network entity, after the gap time, using the second beam.

One innovative aspect of the subject matter described in this disclosure can be implemented in a method for wireless communications by a network entity such as a BS. The method generally includes performing a beam switch from a first beam to a second beam, transmitting signaling, to a user equipment (UE), indicating the beam switch from the first beam to the second beam, identifying a gap time after the beam switch when one or more conditions are met, and communicating with the UE, after the gap time, using the second beam.

Aspects of the present disclosure provide UEs, network entities, means for, apparatuses, processing systems, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 3 is a table illustrating example subcarrier spacing (SCS) and corresponding cyclic prefix (CP) and symbol duration, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
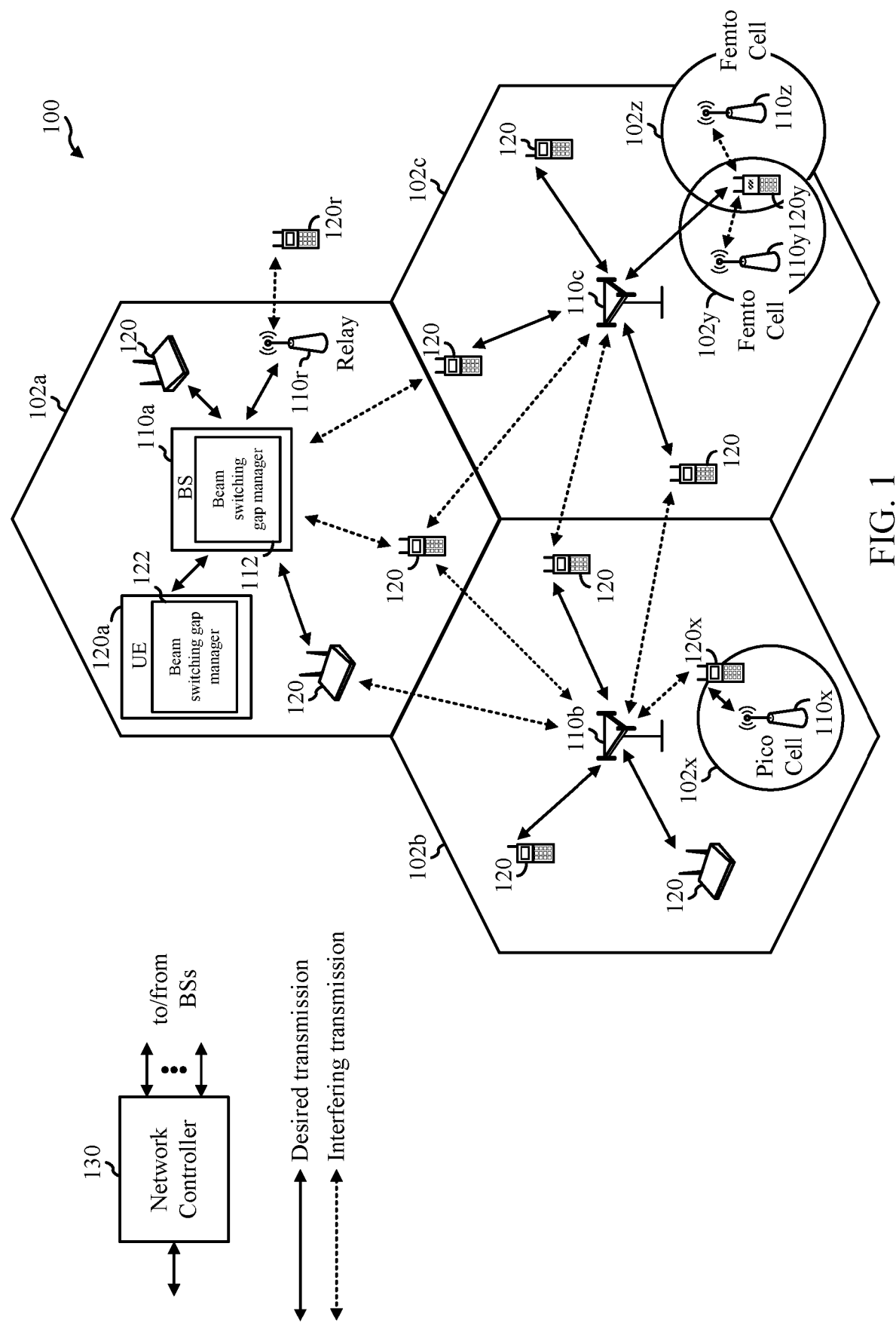
FIG. 1 is a block diagram conceptually illustrating an example telecommunications system, in accordance with certain aspects of the present disclosure.

Aspects of the present disclosure provide apparatus, methods, processing systems, and computer readable mediums for communications between a user equipment (UE) and a network entity (e.g., a base station, such as a gNodeB) with beam switching using a gap time when one or more conditions are met.

In certain systems, such as millimeter wave (mmW) in new radio (5G NR), different transmissions use different beams (e.g., different transmit and/or different receive beams). It may take some time for a device, such as a base station (BS) or user equipment (UE), to switch the beams (e.g., time to switch, activate/deactivate, and/or retune radio frequency (RF) components). In some systems, a configured cyclic prefix (CP) covers the time used for switching the beams. In some cases; however, the CP may not provide sufficient time for the beam switching. For example, when the subcarrier spacing (SCS), or tone spacing, is larger (e.g., which may be the case at higher frequency ranges that may be used in NR), the corresponding symbol duration becomes shorter. Therefore, the CP length also becomes shorter and may be insufficient for the beam switching.

Accordingly, aspects of the present disclosure provide a beam switching gap. The beam switching gap may be separate from the CP, may be dynamically allocated (e.g., configured/indicated), and may take into account UE capability, BS capability, and SCS, for example, The beam switching gap may be explicitly or implicitly allocated.

The following description provides examples of a beam switching gap in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies me. For clarity, while aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Certain wireless networks utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

5G NR may utilize OFDM with a cyclic prefix (CP) on the uplink and downlink and include support for half-duplex operation using time division duplexing (TDD). A subframe can be 1 ms, but the basic transmission time interval (TTI) may be referred to as a slot. A subframe contains a variable number of slots (e.g., 1, 2, 4, 8, 16, . . . slots) depending on the subcarrier spacing (SCS). The NR resource block (RB) may be 12 consecutive frequency subcarriers. NR may support a base SCS of 15 KHz and other subcarrier spacing may be defined with respect to the base SCS, for example, 30 kHz, 60 kHz, 120 kHz, 240 kHz, etc. The symbol and slot lengths scale with the SCS. The CP length also depends on the SCS. 5G NR may also support beamforming and beam direction may be dynamically configured. Multiple-input multiple-output (MIMO) transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may include one or more base stations 110 and one or more UEs 120 configured to perform beam switching as described herein. As shown in FIG. 1, a BS 110a includes a beam switching gap manager 112 configured to perform operations 800 of FIG. 8. Similarly, a UE 120a may include a beam switching gap manager 122 configured to perform operations 700 of FIG. 7.

Generally, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells. The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
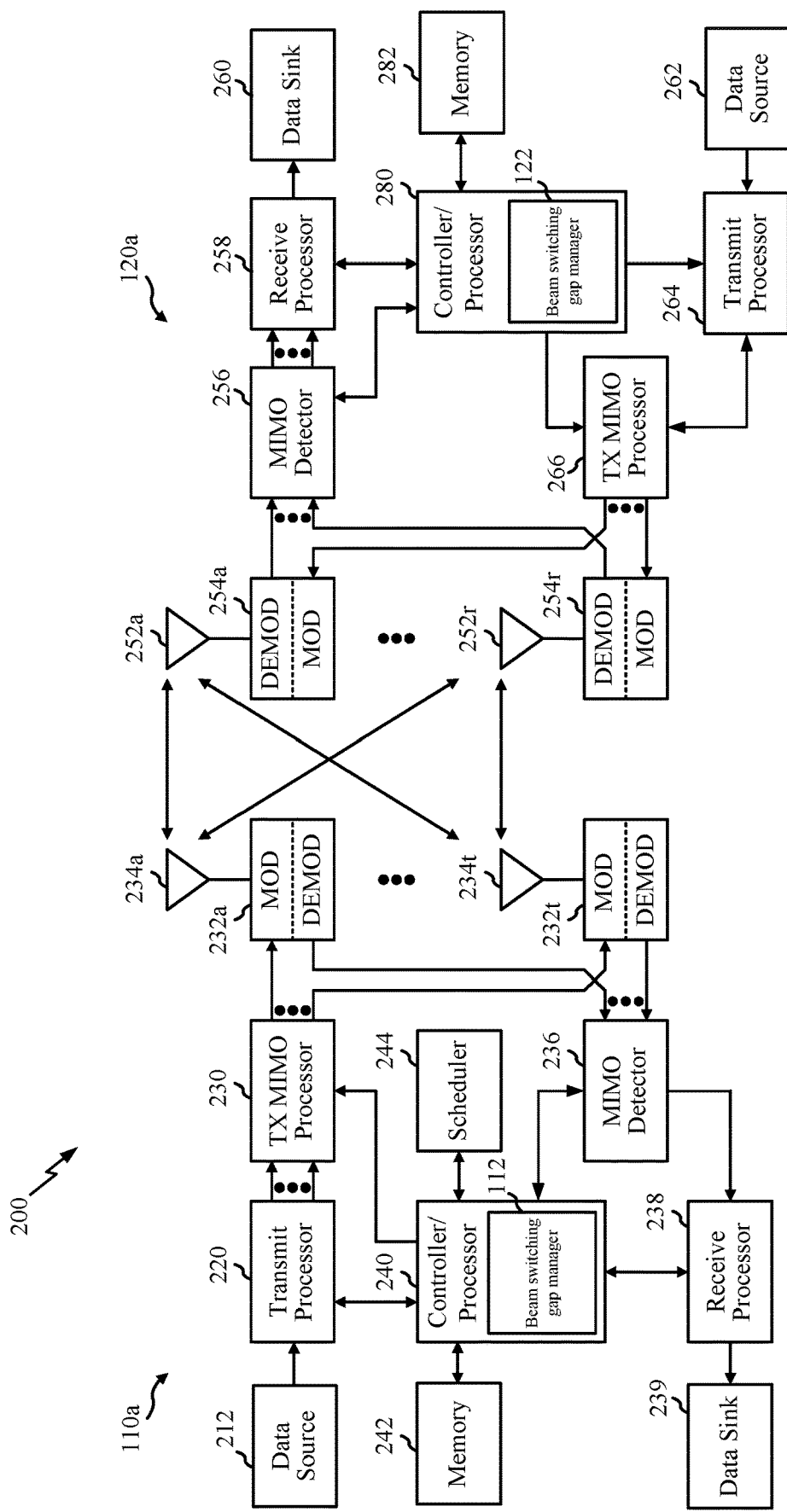
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. For example, a base station may transmit a MAC CE to a user-equipment (UE) to put the UE into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel. A MAC-CE may also be used to communicate information that facilitates communication, such as information regarding buffer status and available power headroom.

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a has an beam switching gap manager 112 that may be configured to perform operations 800 of FIG. 8. As shown in FIG. 2, the controller/processor 280 of the UE 120a has a beam switching gap manager 122 that may be configured to perform operations 700 of FIG. 7. Although shown at the controller/processor, other components of the UE 120a and BS 110a may be used to perform the operations described herein.

QCL Port and TCI States

In many cases, it is important for a UE to know which assumptions it can make on a channel corresponding to different transmissions. For example, the UE may need to know which reference signals it can use to estimate the channel in order to decode a transmitted signal (e.g., PDCCH or PDSCH). It may also be important for the UE to be able to report relevant channel state information (CSI) to the BS (gNB) for scheduling, link adaptation, and/or beam management purposes. In NR, the concept of quasi co-location (QCL) and transmission configuration indicator (TCI) states is used to convey information about these assumptions.

QCL assumptions are generally defined in terms of channel properties. Per 3GPP TS 38.214, "two antenna ports are said to be quasi-co-located if properties of the channel over which a symbol on one antenna port is conveyed can be inferred from the channel over which a symbol on the other antenna port is conveyed." Different reference signals may be considered quasi co-located ("QCL'd") if a receiver (e.g., a UE) can apply channel properties determined by detecting a first reference signal to help detect a second reference signal. TCI states generally include configurations such as QCL-relationships, for example, between the DL RSs in one CSI-RS set and the PDSCH DMRS ports.

In some cases, a UE may be configured with up to M TCI-States. Configuration of the M TCI-States can come about via higher layer signalling, while a UE may be signalled to decode PDSCH according to a detected PDCCH with DCI indicating one of the TCI states. Each configured TCI state may include one RS set TCI-RS-SetConfig that indicates different QCL assumptions between certain source and target signals.

A source reference signal (RS) may be associated with a target signal. In this context, a target signal generally refers to a signal for which channel properties may be inferred by measuring those channel properties for an associated source signal. As noted above, a UE may use the source RS to determine various channel parameters, depending on the associated QCL type, and use those various channel properties (determined based on the source RS) to process the target signal. A target RS does not necessarily need to be PDSCH's DMRS, rather it can be any other RS: PUSCH DMRS, CSIRS, TRS, and SRS.

Each TCI-RS-SetConfig contains parameters. These parameters can, for example, configure quasi co-location relationship(s) between reference signals in the RS set and the DM-RS port group of the PDSCH. The RS set contains a reference to either one or two DL RSs and an associated quasi co-location type (QCL-Type) for each one configured by the higher layer parameter QCL-Type.

For the case of two DL RSs, the QCL types can take on a variety of arrangements. For example, QCL types may not be the same, regardless of whether the references are to the same DL RS or different DL RSs. In the illustrated example, SSB is associated with Type C QCL for P-TRS, while CSI-RS for beam management (CSIRS-BM) is associated with Type D QCL.

QCL information and/or types may in some scenarios depend on or be a function of other information. For example, the quasi co-location (QCL) types indicated to the UE can be based on higher layer parameter QCL-Type and may take one or a combination of the following types:

QCL-TypeA: {Doppler shift, Doppler spread, average delay, delay spread},
QCL-TypeB: {Doppler shift, Doppler spread},
QCL-TypeC: {average delay, Doppler shift}, and
QCL-TypeD: {Spatial Rx parameter}, Spatial QCL assumptions (QCL-TypeD) may be used to help a UE to select an analog Rx beam (e.g., during beam management procedures). For example, an SSB resource indicator may indicate a same beam for a previous reference signal should be used for a subsequent transmission.

An initial CORESET (e.g., CORESET ID 0 or simply CORESET #0) in NR may be identified during initial access by a UE (e.g., via a field in the MIB). A ControlResourceSet information element (CORESET IE) sent via radio resource control (RRC) signaling may convey information regarding a CORESET configured for a UE. The CORESET IE generally includes a CORESET ID, an indication of frequency domain resources (e.g., number of RBs) assigned to the CORESET, contiguous time duration of the CORESET in a number of symbols, and Transmission Configuration Indicator (TCI) states.

As noted above, a subset of the TCI states provide quasi co-location (QCL) relationships between DL RS(s) in one RS set (e.g., TCI-Set) and PDCCH demodulation RS (DMRS) ports. A particular TCI state for a given UE (e.g., for unicast PDCCH) may be conveyed to the UE by the Medium Access Control (MAC) Control Element (MAC-CE). The particular TCI state is generally selected from the set of TCI states conveyed by the CORESET IE, with the initial CORESET (CORESET #0) generally configured via MIB.

Search space information may also be provided via RRC signaling. For example, the SearchSpace IE is another RRC IE that defines how and where to search for PDCCH candidates for a given CORESET. Each search space is associated with one CORESET. The SearchSpace IE identifies a search space configured for a CORESET by a search space ID. In an aspect, the search space ID associated with CORESET #0 is SearchSpace ID #0. The search space is generally configured via PBCH (MIB).

Impact of Beam Switching

As mentioned above, aspects of the disclosure relate to a beam switching gap. As discussed above, a UE and/or BS may take time to switch beams (e.g., around 0.1 μs). The time for switching beams may be based on the capability of the device. For example, a lower capability UE and/or BS may take longer to switch beams and a higher capability UE and/or BS may take a shorter time to switch beams.

FIG. 3 is a table 300 illustrating example SCS and corresponding CP length and symbol duration, in accordance with certain aspects of the present disclosure. Generally, as illustrated in FIG. 3, the CP length may be inversely proportional to the SCS, such that smaller SCSs are associated with longer CP lengths, and vice versa and may be applicable to communications on the physical downlink shared channel (PDSCH) and the physical uplink shared channel (PUSCH).

Figure 4:
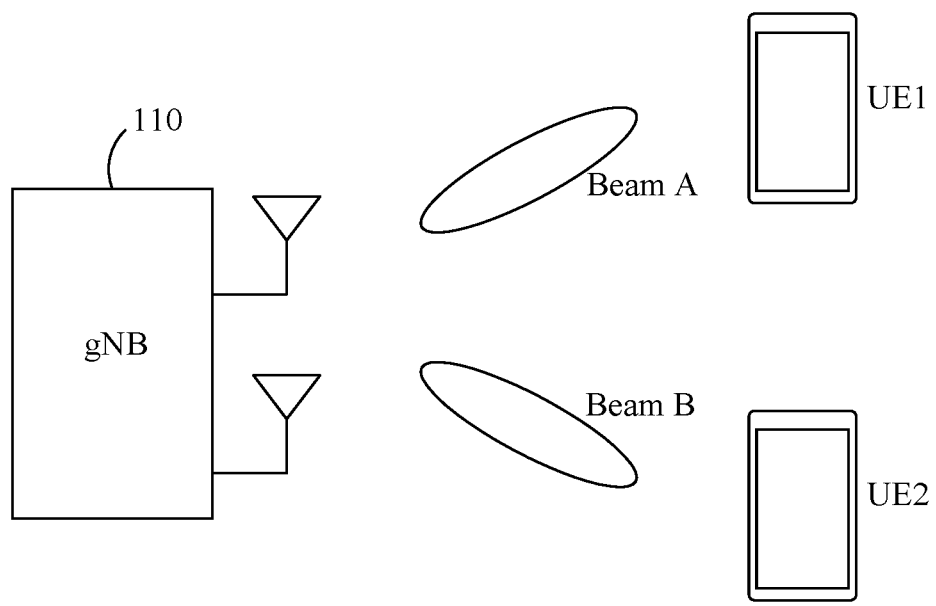
FIG. 4 illustrates example transmissions using different beams, in accordance with certain aspects of the present disclosure.

Beam switches may be signaled for various reasons. For example, referring to FIG. 4, a gNB may signal a first UE1 to switch to a first beam (Beam A) in order to reduce interference to communications with a second UE2 using a second beam (Beam B).

As discussed above, in some systems, the CP may be used to cover the time used for switching the beams used to communicate between a UE and a base station. For example, in frequency range (FR2) mmW with a 60 kHz or 120 kHz SCS, the CP length of 1.725 μs and 0.5625 μs (as shown in FIG. 3), respectively, may be sufficient to cover the beam switching duration, as the CP length for both the 60 kHz and 120 kHz SCSs are significantly longer than a 0.1 μs beam switching duration. In some cases, however, the CP length may not provide sufficient time for the beam switching. For example, in certain systems such as highband systems (e.g., mmW systems operating above 52.6 GHz), larger SCSs may be used, corresponding to short symbol duration and CP length. As shown in FIG. 3, for an SCS of 480 kHz, the CP length is 0.14656 μs, and for an SCS of 3840 kHz, the CP length is reduced to 0.01832 μs. Thus, at the higher SCSs, the CP length may be insufficient to cover the beam switching duration, and an entire symbol may be needed to cover a beam switching duration in which different beams are used for communications between the UE and the base station.

mmWave systems rely on directional beamforming to meet link budget targets and relatively frequent switches of beam directions may be required in certain use cases. In general, beam switch corresponds to spatial domain filter changes (e.g., signaling different transmission configuration indicator (TCI) states). The effective channel experienced by a UE and gNB is time-varying during beam switch time. A beam switch is typically assumed to take place in the CP of a symbol. If the beam switch takes too long, this may exceed the CP duration and defeat the circular structure of a CP-OFDM symbol, which may cause error vector magnitude (EVM) loss and lower decoding rates.

As noted above, beam switches may be signaled as a change in TCI states causing spatial domain filter changes. In some cases, there may be limits on spatial domain filter changes within a slot. For example, in some cases, various rules may be assumed. For example, if a UE is configured with SS-PBCH block(s) for layer 1 (L1) reference signal received power (L1-RSRP) measurement, the UE may be assumed to apply the same spatial domain filter to receive all OFDM symbols carrying one SS-PBCH block.

If a UE is configured with a CSI-RS resource set with high layer parameter repetition set to be "ON", the UE may be assumed to apply different spatial domain filters to receive different CSI-RS resources in the CRI-RS resource set. If a UE is configured with a CSI-RS resource that has no TCI state configured or SRS resource that has no spatial relation configured, the UE may be assumed to change spatial domain filters to receive adjacent CSI-RS resources or transmit adjacent SRS resources.

If two adjacent DL symbols have different configured/activated QCL-TypeD assumptions, the UE may be assumed to apply different spatial domain filters. This may include the case when the UE is to receive different SSBs in consecutive symbols. If two adjacent UL symbols have different configured/activated spatial relations/UL TCI states with different QCL-TypeD assumptions, the UE may be assumed to apply different spatial domain filters. If two adjacent symbols are different directionally (UL-DL or DL-UL), the UE may be assumed to apply different spatial domain filters.

On the other hand, if two adjacent DL symbols have the same configured/activated QCL-TypeD assumptions, the UE may be assumed to apply the same spatial domain filter. Similarly, if two adjacent UL symbols have the same configured/activated spatial relation, the UE may be assumed to apply the same spatial domain filter.

Example Gap Configurations for Beam Switching

Aspects of the present disclosure provide a beam switching gap that can be used to allow for gap time configurations for switching between beams (e.g., in higher mmWave frequency bands) used for communications between a UE and a base station (B S).

Figure 5:
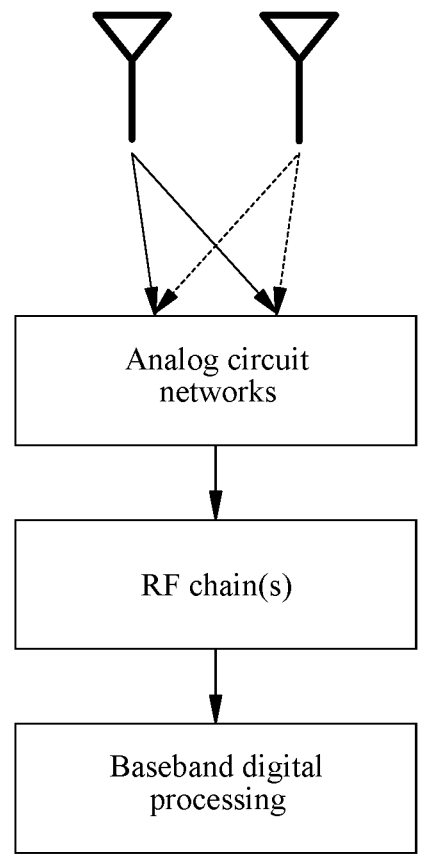
FIG. 5 illustrates example components involved in beam switching, in accordance with certain aspects of the present disclosure.

As illustrated in FIG. 5, directional beamforming described herein can be applied by analog RF components in an analog circuit network or in digital domain. Analog RF components include phase shifters and switches. A change of the beamforming directions or so-called beams can be achieved by changing configuration of RF components (e.g., by changing the phase response of phase shifters).

As noted above, when switching beams, a delay from triggering the change to the final settled state is expected, typically in several hundred ns second. Thus, the impact of beam switching is that it effectively makes the channel time-varying.

Figure 6:
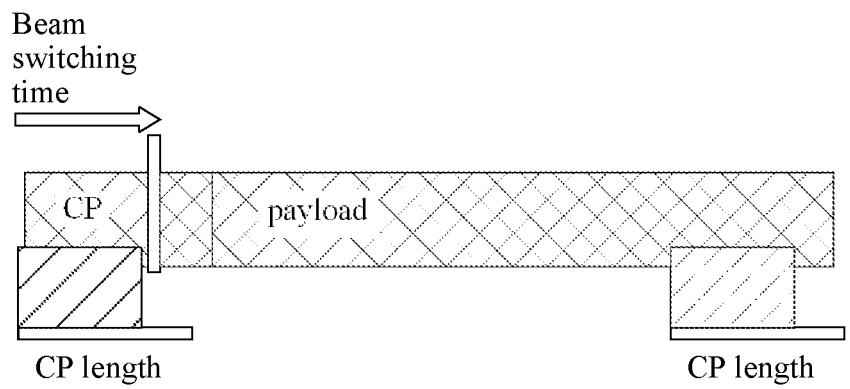
FIG. 6 illustrates an example beam switching timing diagram, in accordance with certain aspects of the present disclosure.

As illustrated in FIG. 6, a beam switch is typically assumed to take place in a CP of a symbol. As noted above, if the beam switch time is too long, it may exceed a CP and defeat the circular structure of CP-OFDM, and cause EVM loss and lower decoding rates. Channel differences at CP intervals due to beam switching may cause inter-symbol interference (ISI).

The effect of beam switching may be different to different types of symbols. If additional EVM loss is applied on DMRS symbol, the channel estimation may be corrupted, and the error may propagate to decoding of all symbols. Such EVM loss for a data symbol may only have local impact. Certain symbols have lower MCS, and are more robust to EVM loss. Tx and Rx beam switches may have different settling times. Even for the same settling time, a Tx beam switch may have a longer impact time, considering channel delay taps in general.

As noted above, certain systems may use higher mmW band >52.6 GHz for the access channel. In such cases, a larger bandwidth for a component carrier (CC) may be considered. A larger tone spacing may also be used (e.g. 960 KHz), which may help achieve better handling of phase noise and reduce inter-carrier interference. Larger tone spacing may also reduce the size of FFT/IFFT, which generally equates to the number of tones, and may reduce transmission time interval (TTI) length.

Therefore, in higher mmW band, when using larger tone spacing, the symbol length may be significantly shorter than other bands (e.g. 8× shorter than 120 KHz symbol). Given the same CP overhead, the CP is much shorter, For example, a 960 KHz symbol CP is 590/8=75 ns. The CP may be even shorter than (or closer to) to the beam switching time.

To address the larger impact beam switching time may have on symbols using larger tone spacing, aspects of the present disclosure propose adding a gap time after certain beam switch times, in order to protect the reception of the symbol after the beam switch when certain conditions are met.

Figure 7:
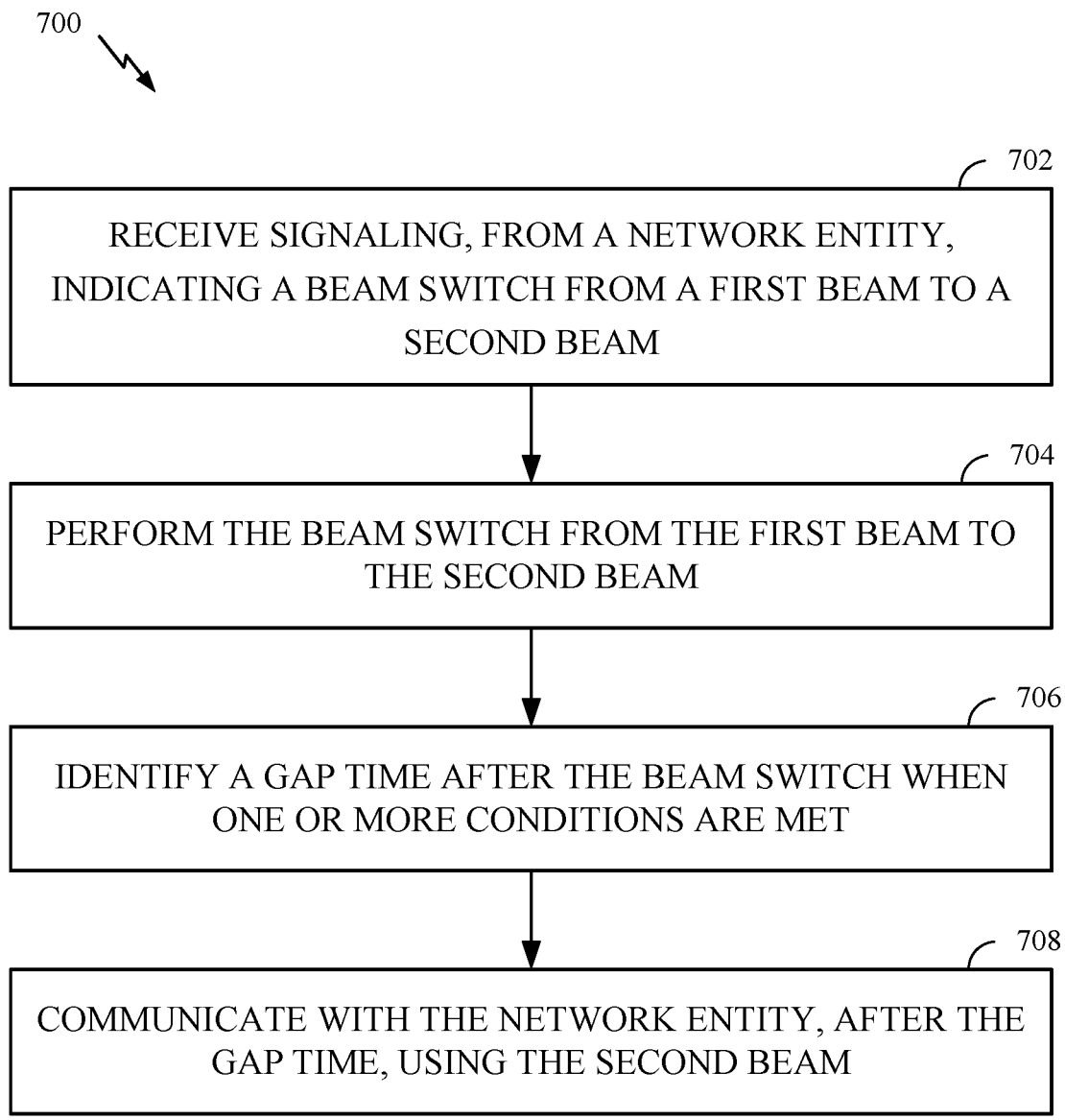
FIG. 7 is a flow diagram illustrating example operations for wireless communication by a user equipment (UE), in accordance with certain aspects of the present disclosure.

FIG. 7 is a flow diagram illustrating example operations 400 for wireless communication by a user equipment (UE), in accordance with certain aspects of the present disclosure. The operations 700 may be performed, for example, by UE (e.g., such as a UE 120a in the wireless communication network 100). Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 700 begin, at 702, by receiving signaling, from a network entity, indicating a beam switch from a first beam to a second beam. At 704, the UE performs the beam switch from the first beam to the second beam. At 706, the UE identifies a gap time after the beam switch when one or more conditions are met. At 708, the UE communicates with the network entity, after the gap time, using the second beam.

Figure 8:
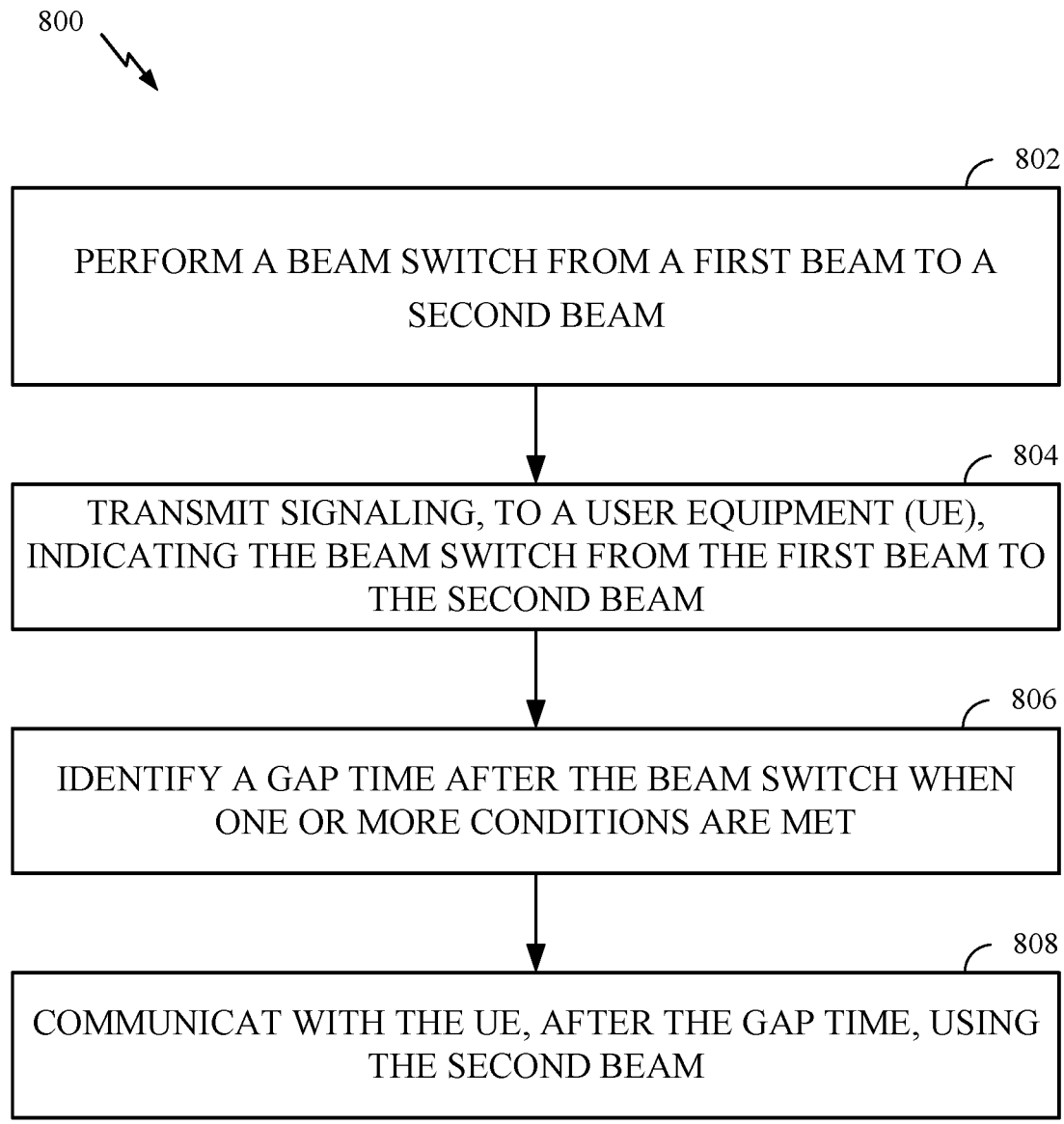
FIG. 8 is a flow diagram illustrating example operations for wireless communication by a network entity, in accordance with certain aspects of the present disclosure.

FIG. 8 is a flow diagram illustrating example operations 800 that may be considered complementary to operations 700 of FIG. 7. For example, operations 800 may be by a BS (e.g., such as the BS 110a in the wireless communication network 100) to signal beam switches to a UE performing operations 700 of FIG. 7. Operations 800 may be implemented as software components that are executed and run on one or more processors (e.g., controller/processor 240 of FIG. 2). Further, the transmission and reception of signals by the BS in operations 800 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 800 begin, at 802, by performing a beam switch from a first beam to a second beam. At 804, the network entity transmits signaling, to a user equipment (UE), indicating the beam switch from the first beam to the second beam. At 806, the network entity identifies a gap time after the beam switch when one or more conditions are met. At 808, the network entity communicates with the UE, after the gap time, using the second beam.

Figure 9:
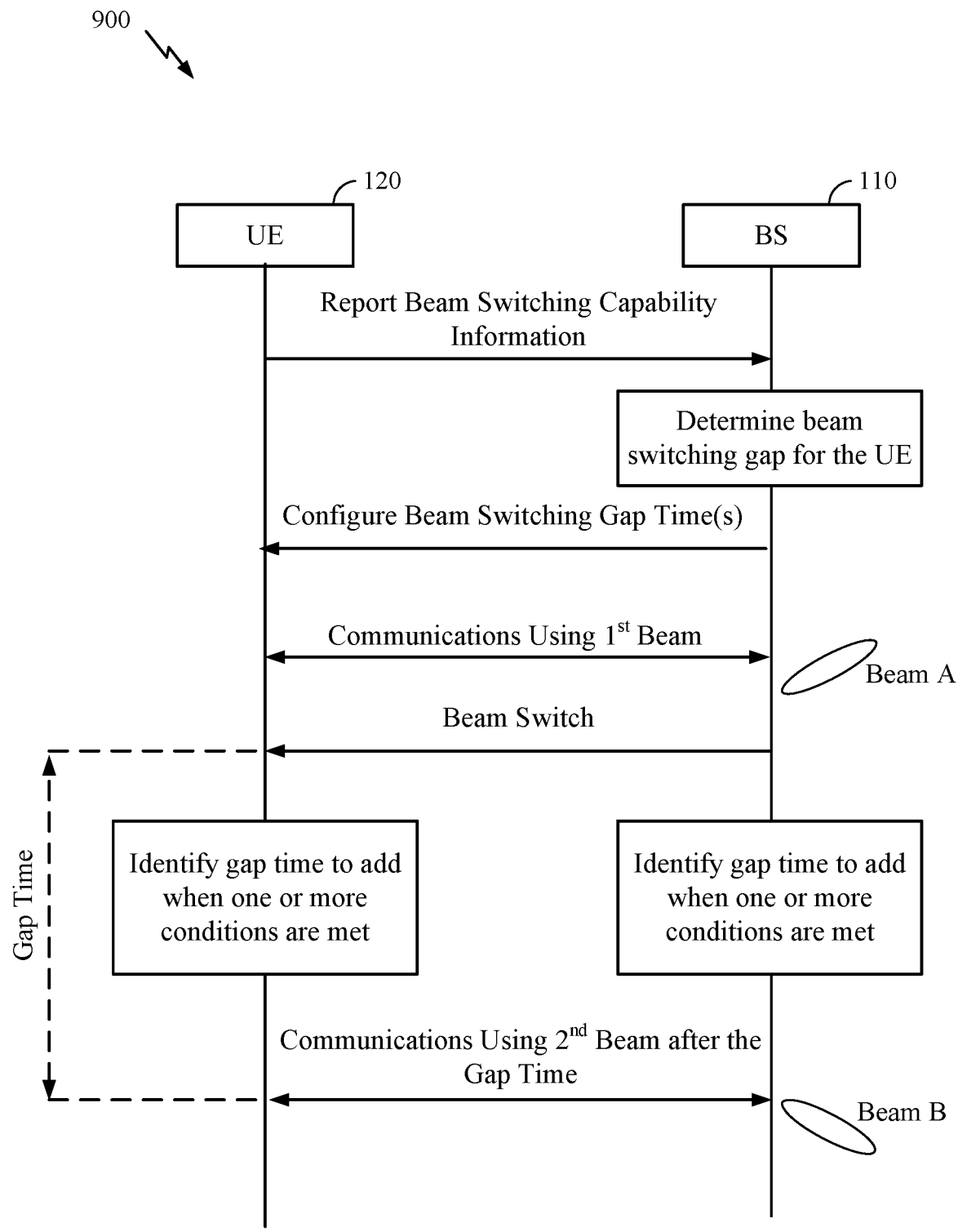
FIG. 9 illustrates an example call flow diagram with beam switching, in accordance with certain aspects of the present disclosure.

Operations 700 and 800 of FIGS. 7 and 8 may be understood with reference to the call flow diagram 900 of FIG. 9, which illustrate an example UE 120 and BS 130. The example assumes the UE and BS are communicating using a first beam when the BS signals a beam switch to a second beam. As illustrated, the UE and BS identify a gap time to add after the beam switch, when one or more conditions are met. In other words, the UE and BS may begin communicating using the second beam a gap time after the beam switch.

Applying the gap time after a certain beam switch time may help protect the reception of the symbol after the beam switch when the certain conditions are met. In some cases, the gap length may be defined in symbols, or in other time units (e.g., ns). The gap length may be based on a fixed rule.

Referring back to FIG. 9, in some cases, the UE may report its beam switching capability to the BS. For example, the UE may report whether it requires gap time after beam switch in different cases, and possibly a required length of the gap time. In some cases, the UE may report its settling time for each type of beam switch. Whenever a beam switch of a certain type occurs, the UE and BS may apply the gap time corresponding to that type of beam switch.

As illustrated, based on the reported beam switching capability of the UE, the BS may send the UE a configuration of beam switching gap times designed to satisfy the UE capability indicated in the report.

As noted above, the condition to apply a certain gap time after a beam switch may be based on the type of beam switch (e.g., whether UL-UL, DL-DL, UL-DL or DL-UL). For example, a change of direction (UL-DL or DL-UL) may need a longer gap time than if there were no change of direction (UL-UL or DL-DL). Even if no change in direction, UL-UL may need longer time for DL-DL, as the UE may need longer time to prepare the Tx RF circuit which may mean the Tx beam switch has a longer impact time.

In some cases, the condition to apply a certain gap time after a beam switch may be based on a type of channel (transmitted) after beam switch. For example, DMRS, CSI-RS for channel measurement may need a gap before to ensure measurement accuracy.

In some cases, the condition to apply a certain gap time after a beam switch may be based on a configuration of symbols, for example, based on an MCS of PDSCH/PUSCH.

In some cases, the condition to apply a certain gap time after a beam switch may be based on a traffic priority or QoS requirement. For example, a certain gap time may be applied depending on whether the traffic is for URLLC or the traffic has a higher Physical layer (PHY) priority.

In some cases, the condition to apply a certain gap time after a beam switch may be based on a length of the data transmission (PDSCH/PUSCH/PUCCH) after the beam switch. For example, in a mini slot case, PDSCH/PUSCH may only have 1-2 symbols in total, such that a larger fraction of data may be affected decoding due to beam switch. Therefore a gap may be needed before a mini-slot. For longer assignments (e.g., 12 symbols in a slot), the affected symbols may be locally in a code block CB or decoding may still work due to channel coding.

As noted above, the condition to apply a certain gap time after a beam switch may be based on a gNb configuration. In other words, as shown in FIG. 7, the BS may signal whether a gap will be added in different cases to UEs. Based on different conditions, different gap time may be assumed. In general, based on different conditions, different gap time may be assumed.

UE and gNB behavior regarding a gap time after a beam switch may be coordinated. For example, once a gap time is determined, the UE may not be expected to transmit or receive (Tx/Rx) in the gap. There are various options for how the UE and BS behave if a previously scheduled transmission overlaps the gap time. According to one option, only a gap symbol may be skipped.

According to another option, the whole transmission may be skipped. For example, if the UE is scheduled with a P-CSI-RS resource in symbol 6-7 in TCI1, but later receive another DCI to receive from TCI0 in symbol 3-5, the UE may require a beam switch in symbol 6. If a gap symbol is configured in this beam switch after symbol 5, the UE can either skip receiving symbol 6 (Alt1) or skip receiving CSI-RS (Alt2). Similarly, based on the rule, the gNB may also not be expected to receive from the UE during the gap time.

Example Communications Devices

Figure 10:
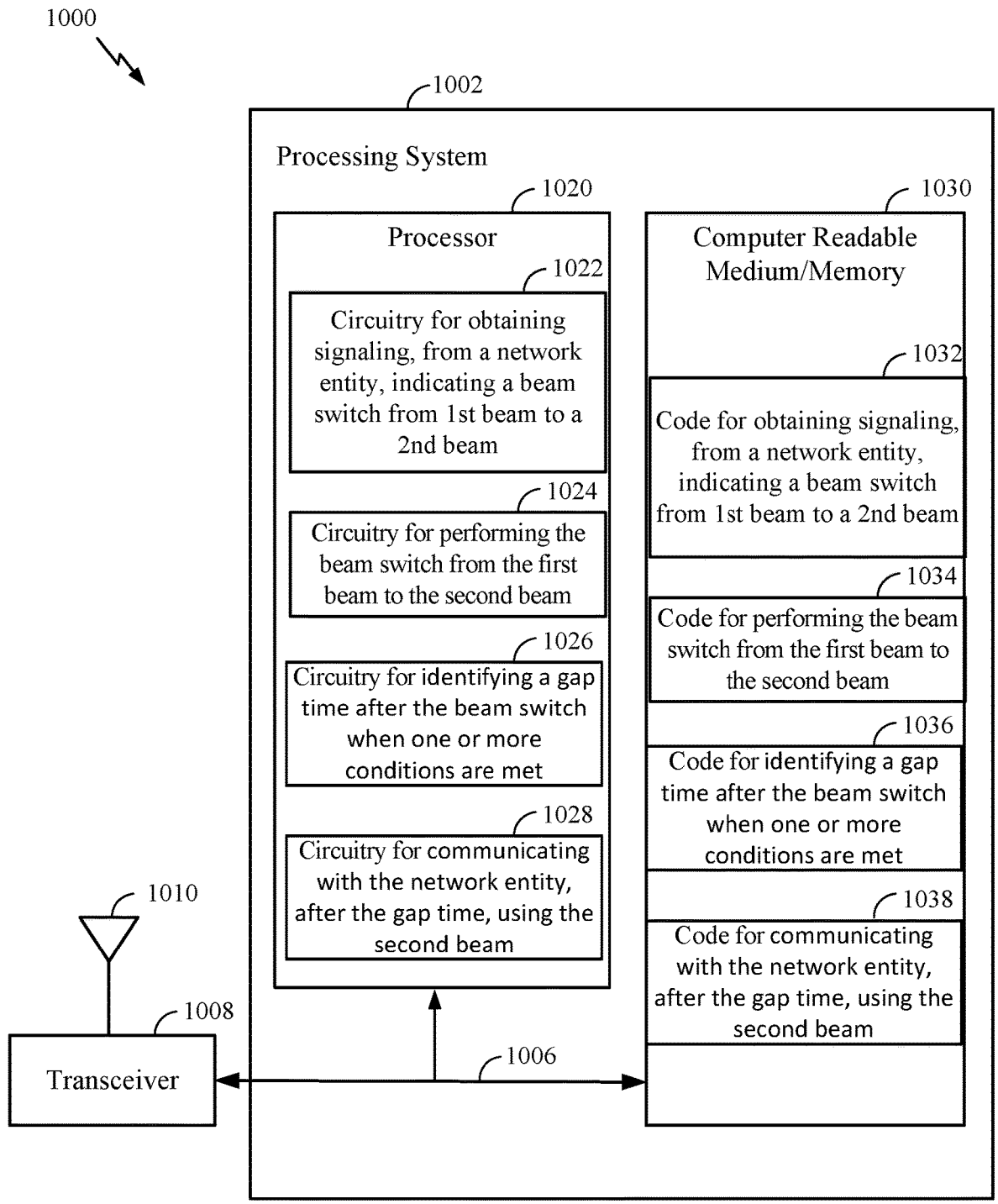
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1020 coupled to a computer-readable medium/memory 1030 via a bus 1006. In certain aspects, the computer-readable medium/memory 1030 is configured to store instructions (e.g., computer-executable code) that when executed by the processor 1020, cause the processor 1020 to perform the operations illustrated in FIG. 7, or other operations for performing the various techniques discussed herein for a beam switching gap.

In certain aspects, computer-readable medium/memory 1030 stores code 1032 for obtaining signaling, from a network entity, indicating a beam switch from a first beam to a second beam; code 1034 for performing the beam switch from the first beam to the second beam; code 1036 for identifying a gap time after the beam switch when one or more conditions are met; and code 1038 for communicating with the network entity, after the gap time, using the second beam.

In certain aspects, the processor 1020 has circuitry configured to implement the code stored in the computer-readable medium/memory 1030. The processor 1020 includes circuitry 1022 for obtaining signaling, from a network entity, indicating a beam switch from a first beam to a second beam; circuitry 1024 for performing the beam switch from the first beam to the second beam; circuitry 1026 for identifying a gap time after the beam switch when one or more conditions are met; and circuitry 1028 for communicating with the network entity, after the gap time, using the second beam.

Figure 11:
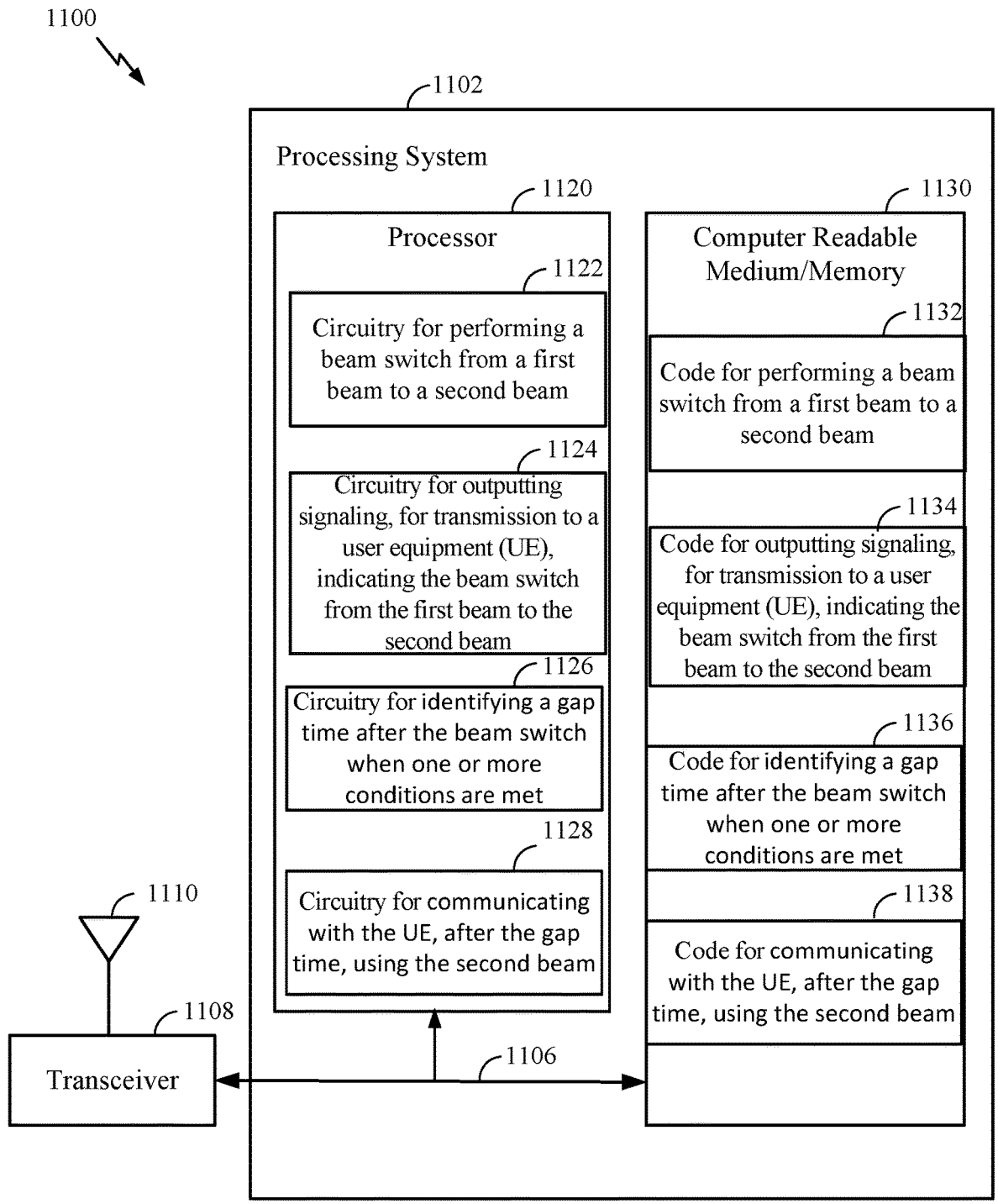
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1120 coupled to a computer-readable medium/memory 1130 via a bus 1106. In certain aspects, the computer-readable medium/memory 1130 is configured to store instructions (e.g., computer-executable code) that when executed by the processor 1120, cause the processor 1120 to perform the operations illustrated in FIG. 8, or other operations for performing the various techniques discussed herein for a beam switching gap.

In certain aspects, computer-readable medium/memory 1130 stores code 1132 for performing a beam switch from a first beam to a second beam; code 1134 for outputting signaling, for transmission to a user equipment (UE), indicating the beam switch from the first beam to the second beam; code 1136 for identifying a gap time after the beam switch when one or more conditions are met; and code 1138 for communicating with the UE, after the gap time, using the second beam.

In certain aspects, the processor 1120 has circuitry configured to implement the code stored in the computer-readable medium/memory 1130. The processor 1120 includes circuitry 1122 for performing a beam switch from a first beam to a second beam; circuitry 1124 for outputting signaling, for transmission to a user equipment (UE), indicating the beam switch from the first beam to the second beam; circuitry 1126 for identifying a gap time after the beam switch when one or more conditions are met; and circuitry 1128 for communicating with the UE, after the gap time, using the second beam.

Example Aspects

Aspect 1: A method for wireless communications by a user equipment (UE), comprising: receiving signaling, from a network entity, indicating a beam switch from a first beam to a second beam; performing the beam switch from the first beam to the second beam; identifying a gap time after the beam switch when one or more conditions are met; and communicating with the network entity, after the gap time, using the second beam.

Aspect 2: The method of Aspect 1, wherein the gap time is defined in units of symbols or absolute time.

Aspect 3: The method of Aspect 1, further comprising: receiving, from the network entity, a configuration, wherein a length of the gap time is determined based on at least one of beam switching capability information of the UE reported or to be reported to the network entity or the configuration.

Aspect 4: The method of Aspect 3, wherein: the beam switching capability information comprises an indication of one or more settling times for the UE after one or more types of beam switches; and the configuration indicates one or more gap time lengths that satisfy the indicated one or more settling times.

Aspect 5: The method of Aspect 1, wherein the one or more conditions relate to a type of the beam switch.

Aspect 6: The method of Aspect 5, wherein different types of beam switches with different gap time lengths include at least two of: a beam switch from an uplink beam to another uplink beam; a beam switch from a downlink beam to another downlink beam; a beam switch from the uplink beam to the downlink beam; or a beam switch from the downlink beam to the uplink beam.

Aspect 7: The method of Aspect 1, wherein the one or more conditions relate to a type of reference signal used to measure a channel after the beam switch.

Aspect 8: The method of Aspect 7, wherein different types of beam switches with different gap time lengths include at least two of: a beam switch from an uplink beam to another uplink beam; a beam switch from a downlink beam to another downlink beam; a beam switch from the uplink beam to the downlink beam; or a beam switch from the downlink beam to the uplink beam.

Aspect 9: The method of Aspect 1, wherein the one or more conditions relate to a characteristic of a type of transmission to be transmitted via the first beam or the second beam.

Aspect 10: The method of Aspect 9, wherein the characteristic comprises at least one of: tone spacing; cyclic prefix length; a modulation and coding scheme (MCS); a traffic priority; a quality of service (QoS) parameter; or a length of a data transmission.

Aspect 11: The method of Aspect 1, further comprising receiving, from the network entity, a configuration indicating the one or more conditions regarding when to add the gap time.

Aspect 12: The method of Aspect 11, wherein the configuration indicates different gap time lengths to be added after beam switching when different conditions are met.

Aspect 13: The method of Aspect 1, further comprising: refraining from transmitting or receiving via the second beam during the gap time.

Aspect 14: The method of Aspect 1, further comprising: skipping at least a portion of a previously scheduled transmission when the previously scheduled transmission overlaps the gap time.

Aspect 15: The method of Aspect 14, wherein the UE skips only the portion of the previously scheduled transmission that overlaps the gap time.

Aspect 16: A method for wireless communications by a network entity, comprising: performing a beam switch from a first beam to a second beam; transmitting signaling, to a user equipment (UE), indicating the beam switch from the first beam to the second beam; identifying a gap time after the beam switch when one or more conditions are met; and communicating with the UE, after the gap time, using the second beam.

Aspect 17: The method of Aspect 16, wherein the gap time is defined in units of symbols or absolute time.

Aspect 18: The method of Aspect 16, further comprising: receiving, from the UE beam switching capability information, wherein a length of the gap time is determined based on at least one of: the beam switching capability; or a configuration transmitted or to be transmitted to the UE.

Aspect 19: The method of Aspect 18, wherein: the beam switching capability information comprises an indication of one or more settling times for the UE after one or more types of beam switches; and the configuration indicates one or more gap time lengths that satisfy the indicated one or more settling times.

Aspect 20: The method of Aspect 16, wherein the one or more conditions relate to a type of the beam switch.

Aspect 21: The method of Aspect 20, wherein different types of beam switches with different gap time lengths include at least two of: a beam switch from an uplink beam to another uplink beam; a beam switch from a downlink beam to another downlink beam; a beam switch from the uplink beam to the downlink beam; or a beam switch from the downlink beam to the uplink beam.

Aspect 22: The method of Aspect 16, wherein the one or more conditions relate to a type of reference signal used to measure a channel after the beam switch.

Aspect 23: The method of Aspect 22, wherein different types of beam switches with different gap time lengths include at least two of: a beam switch from an uplink beam to another uplink beam; a beam switch from a downlink beam to another downlink beam; a beam switch from the uplink beam to the downlink beam; or a beam switch from the downlink beam to the uplink beam.

Aspect 24: The method of Aspect 16, wherein the one or more conditions relate to a characteristic of a type of transmission to be transmitted via the first beam or the second beam.

Aspect 25: The method of Aspect 24, wherein the characteristic comprises at least one of: tone spacing; cyclic prefix length; a modulation and coding scheme (MCS); a traffic priority; a quality of service (QoS) parameter; or a length of a data transmission.

Aspect 26: The method of Aspect 16, further comprising transmitting, to the UE, a configuration indicating the one or more conditions regarding when to add the gap time.

Aspect 27: The method of Aspect 26, wherein the configuration indicates different gap time lengths to be added after beam switching when different conditions are met.

Aspect 28: The method of Aspect 16, further comprising: refraining from transmitting or receiving via the second beam during the gap time.

Aspect 29: The method of Aspect 16, further comprising: skipping at least a portion of a previously scheduled transmission when the previously scheduled transmission overlaps the gap time.

Aspect 30: The method of Aspect 29, wherein the network entity skips only the portion of the previously scheduled transmission that overlaps the gap time.

Aspect 31: A user equipment, comprising means for performing the operations of one or more of Aspects 1-15.

Aspect 32: A user equipment, comprising a transceiver and a processing system including at least one processor configured to perform the operations of one or more of Aspects 1-15.

Aspect 33: An apparatus for wireless communications by a user equipment, comprising: a processing system configured to obtain signaling, from a network entity, indicating a beam switch from a first beam to a second beam; perform the beam switch from the first beam to the second beam; identify a gap time after the beam switch when one or more conditions are met; and communicate with the network entity, after the gap time, using the second beam.

Aspect 34: A computer-readable medium for wireless communications by a user equipment, comprising codes executable by an apparatus to: obtain signaling, from a network entity, indicating a beam switch from a first beam to a second beam; perform the beam switch from the first beam to the second beam; identify a gap time after the beam switch when one or more conditions are met; and communicate with the network entity, after the gap time, using the second beam.

Aspect 35: A network entity, comprising means for performing the operations of one or more of Aspects 16-30.

Aspect 36: A network entity, comprising a transceiver and a processing system including at least one processor configured to perform the operations of one or more of Aspects 16-30.

Aspect 37: An apparatus for wireless communications by a network entity, comprising: a processing system configured to perform a beam switch from a first beam to a second beam; and an interface configure to output signaling, for transmission to a user equipment (UE), indicating the beam switch from the first beam to the second beam, wherein the processing system is further configured to identify a gap time after the beam switch when one or more conditions are met and communicate with the UE, after the gap time, using the second beam.

Aspect 38: A computer-readable medium for wireless communications by a network entity, comprising codes executable by an apparatus to: perform a beam switch from a first beam to a second beam; output signaling, for transmission to a user equipment (UE), indicating the beam switch from the first beam to the second beam; identify a gap time after the beam switch when one or more conditions are met; and communicate with the UE, after the gap time, using the second beam.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node such as a UE or a BS may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120*a* and/or processors 220, 230, 238, and/or controller/processor 240 of the BS 110*a* shown in FIG. 2 may be configured to perform operations 700 of FIG. 7 and/or operations 800 of FIG. 8.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for performing, means for identifying, means for communicating, means for refraining, and means for skipping may include a processing system, which may include one or more processors, such as processors 258, 264 and 266, and/or controller/processor 280 of the UE 120*a* and/or processors 220, 230, 238, and/or controller/processor 240 of the BS 110*a* shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7 and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
receiving signaling, from a network entity, indicating a beam switch from a first beam to a second beam;
performing the beam switch from the first beam to the second beam;
receiving, from the network entity, a configuration indicating one or more conditions regarding when to add a gap time after the beam switch;
identifying the gap time after the beam switch when the one or more conditions are met;
refraining from transmitting or receiving during the gap time; and
communicating with the network entity, after the gap time, using the second beam.

2. The method of claim 1, wherein the gap time is defined in units of symbols or absolute time.

3. The method of claim 1,
wherein a length of the gap time is determined based on at least one of:
beam switching capability information of the UE reported or to be reported to the network entity; or
the configuration.

4. The method of claim 3, wherein:
the beam switching capability information comprises an indication of one or more settling times for the UE after one or more types of beam switches; and
the configuration indicates one or more gap time lengths that satisfy the indicated one or more settling times.

5. The method of claim 1, wherein the one or more conditions relate to a type of the beam switch.

6. The method of claim 5, wherein different types of beam switches with different gap time lengths include at least two of:
a beam switch from an uplink beam to another uplink beam;
a beam switch from a downlink beam to another downlink beam;
a beam switch from the uplink beam to the downlink beam; or
a beam switch from the downlink beam to the uplink beam.

7. The method of claim 1, wherein the one or more conditions relate to a type of reference signal used to measure a channel after the beam switch.

8. The method of claim 7, wherein different types of beam switches with different gap time lengths include at least two of:
a beam switch from an uplink beam to another uplink beam;
a beam switch from a downlink beam to another downlink beam;
a beam switch from the uplink beam to the downlink beam; or
a beam switch from the downlink beam to the uplink beam.

9. The method of claim 1, wherein the one or more conditions relate to a characteristic of a type of transmission to be transmitted via the first beam or the second beam.

10. The method of claim 9, wherein the characteristic comprises at least one of:
tone spacing;
cyclic prefix length;
a modulation and coding scheme (MCS);
a traffic priority;
a quality of service (QoS) parameter; or
a length of a data transmission.

11. The method of claim 1, wherein the configuration indicates different gap time lengths to be added after beam switching when different conditions are met.

12. The method of claim 1, further comprising:
skipping at least a portion of a previously scheduled transmission when the previously scheduled transmission overlaps the gap time.

13. The method of claim 12, wherein the UE skips only the portion of the previously scheduled transmission that overlaps the gap time.

14. A method for wireless communications by a network entity, comprising:
performing a beam switch from a first beam to a second beam;
transmitting signaling, to a user equipment (UE), indicating the beam switch from the first beam to the second beam;
identifying a gap time after the beam switch when one or more conditions are met;
transmitting, to the UE, a configuration indicating the one or more conditions regarding when to add the gap time after the beam switch; and
communicating with the UE, after the gap time, using the second beam.

15. The method of claim 14, wherein the gap time is defined in units of symbols or absolute time.

16. The method of claim 14, further comprising:
receiving, from the UE beam switching capability information, wherein a length of the gap time is determined based on at least one of:
the beam switching capability; or
the configuration transmitted or to be transmitted to the UE.

17. The method of claim 16, wherein:
the beam switching capability information comprises an indication of one or more settling times for the UE after one or more types of beam switches; and
the configuration indicates one or more gap time lengths that satisfy the indicated one or more settling times.

18. The method of claim 14, wherein the one or more conditions relate to a type of the beam switch.

19. The method of claim 18, wherein different types of beam switches with different gap time lengths include at least two of:
a beam switch from an uplink beam to another uplink beam;
a beam switch from a downlink beam to another downlink beam;
a beam switch from the uplink beam to the downlink beam; or
a beam switch from the downlink beam to the uplink beam.

20. The method of claim 14, wherein the one or more conditions relate to a type of reference signal used to measure a channel after the beam switch.

21. The method of claim 20, wherein different types of beam switches with different gap time lengths include at least two of:
a beam switch from an uplink beam to another uplink beam;
a beam switch from a downlink beam to another downlink beam;
a beam switch from the uplink beam to the downlink beam; or
a beam switch from the downlink beam to the uplink beam.

22. The method of claim 20, wherein the configuration indicates different gap time lengths to be added after beam switching when different conditions are met.

23. The method of claim 14, wherein the one or more conditions relate to a characteristic of a type of transmission to be transmitted via the first beam or the second beam.

24. The method of claim 23, wherein the characteristic comprises at least one of:
tone spacing;
cyclic prefix length;
a modulation and coding scheme (MCS);
a traffic priority;
a quality of service (QoS) parameter; or
a length of a data transmission.

25. The method of claim 14, further comprising:
refraining from transmitting or receiving via the second beam during the gap time; or
skipping at least a portion of a previously scheduled transmission when the previously scheduled transmission overlaps the gap time.

26. The method of claim 25, wherein the network entity skips only the portion of the previously scheduled transmission that overlaps the gap time.

27. A user equipment (UE), comprising:
an interface configured to:
obtain signaling, from a network entity, indicating a beam switch from a first beam to a second beam; and
obtain, from the network entity, a configuration indicating one or more conditions regarding when to add a gap time after the beam switch; and
a processing system configured to:
perform the beam switch from the first beam to the second beam;
identify the gap time after the beam switch when the one or more conditions are met;
refrain from transmitting or receiving during the gap time; and
communicate with the network entity, after the gap time, using the second beam.

28. The user equipment of claim 27, wherein:
a length of the gap time is determined based on at least one of:
beam switching capability information of the UE reported or to be reported to the network entity; or
the configuration.

* * * * *